May 19, 1925.
E. WILDHABER
HOB
Filed Dec. 30, 1922
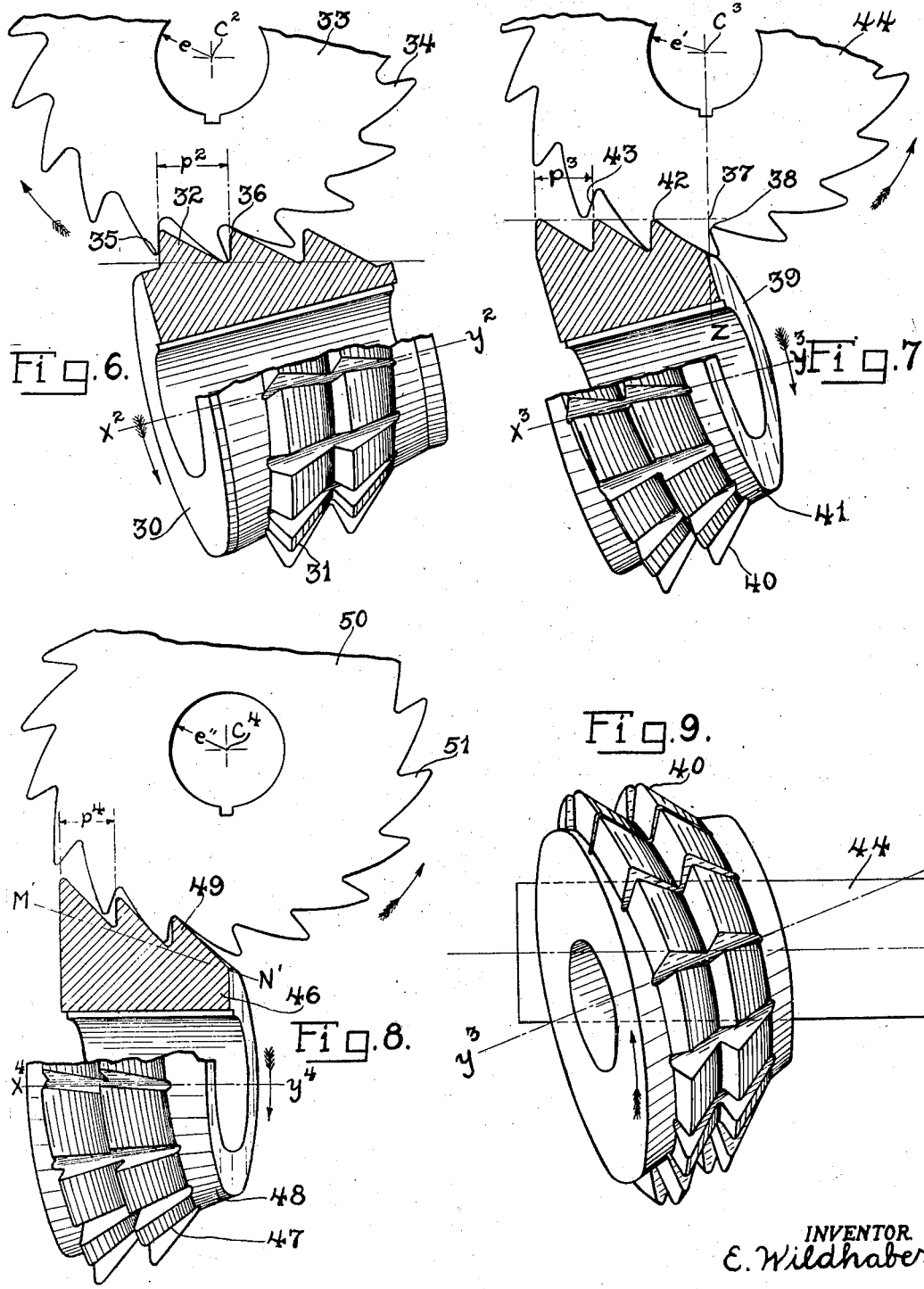
INVENTOR
E. Wildhaber
BY Wayne B Wells
ATTORNEY Patented May 19, 1925.

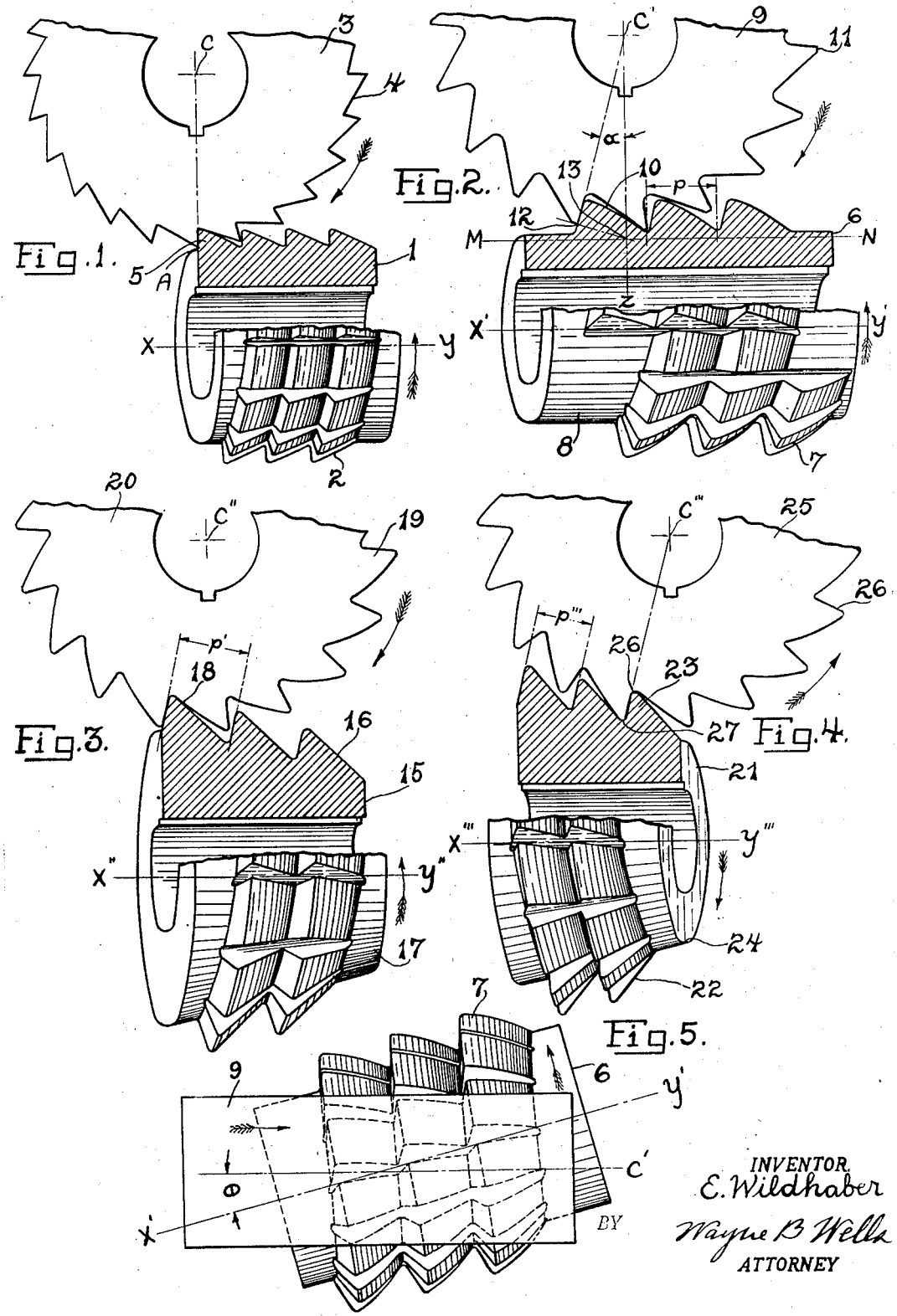

1,538,771

UNITED STATES PATENT OFFICE.

ERNEST WILDHABER, OF BROOKLYN, NEW YORK, ASSIGNOR TO NILES-BEMENT-POND COMPANY, OF NEW YORK, N. Y., A CORPORATION OF NEW JERSEY.

HOB.

Application filed December 30, 1922. Serial No. 609,942.

*To all whom it may concern:*

Be it known that I, ERNEST WILDHABER, a citizen of the Republic of Switzerland, residing at Brooklyn, in the county of Kings and State of New York, have invented certain new and useful Improvements in Hobs, of which the following is a specification.

My invention relates to hobs and particularly to form hobs for shaping milling cutters.

One object of my invention is to provide a form hob that shall comprise teeth arranged in the form of a thread, each of the teeth having one substantially straight cutting edge inclined with respect to the hob axis.

Another object of my invention is to provide a hob that shall comprise teeth having substantially straight cutting edges inclined with respect to the hob axis, a finishing cutting edge being provided on one of the end teeth of the hob.

Another object of my invention is to provide a hob of the above indicated character that shall have teeth arranged in the form of a thread on a conical body portion, a finishing cutting edge being located on the inside or the outside of an end tooth of the hob according to the value of the hob pitch with respect to the pitch on the outside of the blank teeth to be cut.

Another object of my invention is to provide a hob having teeth arranged in the form of a thread on a conical body portion, the teeth having cutting edges inclined with respect to the hob axis and one of the end hob teeth having a finishing cutting edge.

Another object of my invention is to provide a hob that shall cut spiral or straight flutes on a blank to form teeth having radial or undercut cutting faces.

A further object of my invention is to provide a conical hob of the above indicated character that shall have one finishing cutting edge on a tooth located on the small end of the hob and that shall have a hob pitch different from the outside pitch of the blank to form undercut teeth on the blank.

The forming of radial teeth on a milling cutter by a hobbing process has always been considered a difficult operation and it has only been feasible to hob milling cutters having very short teeth. Even when hobbing milling cutters having very short teeth, it has been difficult to form blank teeth having sharp pointed ends such as are desirable in milling cutters. The forming of the blank teeth having spiral flutes increased the difficulties encountered in hobbing cutters. Moreover, the forming of cutters having undercut teeth by the hobbing process has heretofore been deemed practically impossible.

Although it is not possible to form undercut cutting faces on the teeth of a milling cutter or other similar article by means of a generating operation, it is possible to form such cutting faces by means of a hobbing operation. The hob used for performing such operation is of a type sometimes called a form hob. In my applications Serial No. 609,941 filed December 30, 1922 and Serial No. 609,944 filed December 30, 1922, the characteristics of form hobs have been discussed.

The term "form hob" in this application is used to designate a hob wherein the finishing cut is made by one tooth if the hob is single threaded. If the hob is provided with a multiple number of threads, the teeth having finishing cutting edges are increased in accordance therewith. A form hob should not shape a blank by a generating operation, at least the finished face should not be formed by a generating operation. In a hob constructed in accordance with my invention the finishing tooth which determines the shape of the blank is preferably the last cutting tooth on the hob.

In the accompanying drawings:

Figure 1 is a diagrammatic view of a hob having a finishing cutting edge aligned with a blank radial line drawn perpendicularly to the hob axis.

Fig. 2 is a diagrammatic view illustrating a hob having a pitch different from the blank pitch taken along the outside diameter.

Fig. 3 is a diagrammatic view of a cone hob having the finishing tooth on the larger end of the hob.

Fig. 4 is a diagrammatic view of a cone hob having the finishing tooth on the smaller end of the hob.

Fig. 5 is a plan view of the hob and blank shown in Fig. 2.

Fig. 6 and Fig. 7 are diagrammatic views of cone hobs having inclined cutting edges with respect to the axis of the hob, Fig. 8 is a diagrammatic view of a cone hob having cutting edges perpendicular to the path of movement of the hob.

Fig. 9 is a plan view of the hob and blank shown in Fig. 7.

Referring to Fig. 1 of the drawings, a hob 1 having teeth 2 formed on a cylindrical body portion is adapted to rotate on an axis XY. The hob 1 is shown in engagement with a blank 3 having teeth 4 formed thereon. The blank 3 is shown rotating in a clockwise direction on an axis C. The hob 1 is shown as rotating in a clockwise direction when viewed from the right of Fig. 1 of the drawings. The hob 1 is so set with respect to the blank 3 that a tooth 5 on the hob cuts along a radial line CA of the blank, which is disposed perpendicularly to the axis XY of the hob.

The hob 1, when so positioned with respect to the blank 3, will finish radial teeth on the blank. A milling cutter, which is formed in the above indicated manner, is suitable for cutting slots in screws and for other similar operations. It should be noted that the tooth 5 of the hob 1 extends just to the center line of the blank and accordingly will cut radial teeth on the blank. Moreover, it should be noted that the tooth 5 will cut its own profile or shape on the teeth on the blank. The pitch of a hob should correspond to the pitch of the outside diameter of the blank 3.

The tooth 5 on the hob performs all finishing cuts whereas the remaining teeth on the hob perform merely rough work preparatory to the finishing cuts. The hobbing of a blank in the above indicated manner has some drawbacks which vary in accordance with the size of the teeth to be cut on the blank. If the teeth are comparatively large then the straight cutting edge of the finishing tooth 5 on the hob will not cut along a straight line on the blank and the profile of each tooth on the blank will be somewhat curved on account of the helicoidal action of the hob. It is, of course, apparent that a planing tool would cut along a straight line on the blank if used in place of a hob. When a hob operates on a blank, the hob and the blank rotate in timed relation to each other. Accordingly, a hob does not apply a complete finishing cut on a tooth when the blank is in one position. Such curvature on the blank teeth becomes more pronounced if a multiple thread hob is utilized in hobbing the blank.

Moreover, the so positioning of the radial cutting face of the tooth 5 does not permit the forming of spiral flutes on the blank. If such a hob were used to form spiral flutes, a convex profile of comparatively sharp curvature would be formed on the blank teeth. The operation of the hob may be compared with the grinding of spiral flutes with the plain side of a grinding wheel. It is well known that it is impossible to grind spiral flutes with the plain side of a grinding wheel and that only convex surfaces are produced which spoil the milling cutter being ground. In order to grind spiral flutes, it is necessary to provide a suitable conical grinding wheel. In accordance with the above reasoning, it is apparent that in order to cut spiral flutes, it is desirable to provide a hob having substantially straight cutting edges which are inclined with respect to the axis of the hob. Thus, it is necessary to provide a hob having cutting edges which are angularly disposed with respect to a blank radius which is perpendicular to the hob axis. The operation of such a form hob is very similar to the operation of a conical grinding or cutting wheel.

Referring to Figs. 2 and 5 of the drawings, a hob is disclosed having cutting edges which are inclined with respect to the hob axis. The inclined cutting edges are obtained by forming a hob with a pitch different from the pitch at the outside diameter of the blank. A hob 6 having teeth 7 formed on a cylindrical body portion 8 is shown in engagement with a milling cutter blank 9. The hob 6 is rotated in a clockwise direction on an axis X'—Y' and is provided with one tooth having a finishing edge 10 located on the left end of the hob, as shown in Fig. 2 of the drawings. The blank 9 is provided with teeth 11 and is adapted to rotate on an axis C' in a clockwise direction, as shown in Fig. 2 of the drawings.

In the cylindrical hob 6 shown in Figs. 2 and 5 of the drawings, a pitch different from the pitch provided on the hob 1 in Fig. 1 is provided in order to obtain inclined cutting edges. The pitch of the hob 1, as heretofore set forth, is made equal to the pitch taken at the outside diameter of the blank. The pitch of the hob 6 is made larger than the pitch taken at the outside diameter of the blank 9.

Assuming the tooth 10 to be in the finishing position and the radial line C'—12 to make an angle $\alpha$ with a radial plane perpendicular to the axis of the hob, the pitch of the rack corresponding to the hub 6 may be obtained in the manner disclosed in my above mentioned application, Serial No. 609,941. A line is drawn through a point 12 on the outside diameter of the blank 9 perpendicularly to the radial line C'—12. Such line intersects the line C'Z drawn perpendicularly to the axis of the hob at a point 13. A line MN drawn through the point 13 parallel to the line of movement of the rack is the pitch line for a rack corresponding to the hob. Thus, the pitch of the rack corresponding to the circular pitch on the circle having a radius equal to C'—13 is $p$. In the case of spiral flutes, the normal pitch of the rack teeth may be obtained by taking the cosine of the inclination angle of the rack teeth with regard to the blank axis C'.

If a rack, or a hob corresponding thereto, is constructed as above indicated and is moved to the left, as shown in Fig. 2 of the drawings, the teeth to the right of the finishing position, shown in Fig. 2, will not interfere with the radial profile of the blank tooth. The hob is illustrated in position to finish one blank tooth as heretofore set forth. If the rolling motion between the hob and the blank were continued to the left beyond the illustrated position, then an involute would be generated. The generation of an involute would start at the position illustrated in the drawings and when the tooth 10 was cutting along the line C'—12.

The position of the tooth 10, as illustrated in Fig. 2 of the drawings, is a limiting position when the hob is provided with a pitch along the line MN and corresponding to the circular pitch at a radius C'—13. If the pitch should be made larger and the pitch line placed farther away from the axis of the blank, the positions of the rack or hob teeth to the right of the illustrated position would not interfere with the radial face of the blank tooth taken along the line C'—12. Moreover, in such case the illustrated position would not be the limiting position and the position at which the generating of an involute would start. However, the changing of the pitch in such manner would form larger flutes on the blank and accordingly weaken the teeth of the blank.

Thus, as above set forth, by using a form hob corresponding to a rack having a pitch different from the pitch of the outside diameter of the blank, it is possible to provide a hob having inclined cutting edges. Such cutting edges, as heretofore set forth, operate in a manner similar to a cone grinding wheel when operating on cutters having helical flutes. In my copending application Serial No. 609,943 filed December 30, 1922 the specific hob shown in Figs. 2 and 5 is claimed.

Referring to Figs. 3 and 4 of the drawings, another embodiment of my invention is illustrated. In Fig. 3 a hob 15 having teeth 16 formed on a conical body portion 17 is adapted to rotate on an axis X"Y". The hob is illustrated as rotating in a clockwise direction when viewed from the right of Fig. 3 of the drawings. The hob is provided with a finishing tooth 18 which is shown in engagement with the teeth 19 of a blank 20. The blank 20 is illustrated as rotating in a clockwise direction on an axis C".

A tapered hob of the type disclosed in Fig. 3 and also in Fig. 4 of the drawings is of particular utility in forming undercut teeth on a milling cutter and also in cutting helical flutes on a milling cutter. It is believed practically necessary to provide a conical hob for forming flutes by the hobbing process to produce undercut teeth on a blank. Moreover, such hobs are important in hobbing spiral flutes. The pitch $p'$ of the hob 15 may be made equal to a pitch taken at the outside diameter of the blank 20. The pitch of the hob may also be made larger than the pitch of the blank at the outside diameter, if so desired. In a hob formed as indicated in Fig. 3 of the drawings, it will be noted the roughing teeth are located to the right of the finishing tooth 18 and on the small end of the cone shaped body portion 17. It is desirable to reverse the position of the teeth in order to have the finishing tooth on the small end of the cone body portion and the roughing teeth on the larger end thereof. When the roughing teeth are set ahead of the finishing tooth on the large end of the cone body portion, the roughing teeth do more work and save the finishing tooth which otherwise would assist in roughing the blank.

Referring to Fig. 4 of the drawings, a hob 21 is illustrated having teeth 22 formed thereon. The hob is adapted to rotate in a clockwise direction on an axis X'''Y''' when viewed from the right of Fig. 4 of the drawings. A finishing tooth 23 is formed on the conical body portion 24 of the hob near the end thereof. In the hob illustrated in Fig. 4, the roughing teeth are located on the larger end of the cone body portion whereas the finishing tooth 23 is located on the smaller end thereof. The hob 21 is shown in engagement with a blank 25 having teeth 26 formed thereon. The blank 25 is adapted to rotate in a counterclockwise direction on an axis C'''. The rack corresponding to the hob 21 shown in Fig. 4 of the drawings will be provided with a pitch $p'''$ which is smaller than the pitch $p'$ of the outside diameter of the blank 25. The pitch at the outside diameter of the blank 25 is the same as the pitch $p'$ indicated in Fig. 3 of the drawings. The rack corresponding to the hob 21 is assumed to have a path of movement perpendicular to the radial line C'''—27 and the pitch $p,'$ as heretofore set forth, must be equal or smaller than the pitch corresponding to a radius C'''—26. The point 26 is located at the bottom of a radial tooth on the blank.

Generally the roughing teeth are mounted on the larger end of the tapered hob if they are located behind the tooth face being finished, as shown in Fig. 4 of the drawings or if the finishing edge is located on the inside of the last tooth. Such arrangement, which may also be used in case of cylindrical hobs forming either radial or inclined cutting teeth, has a further advantage in case the cutter blank is not ground after hardening. An example of such cutters is the screw slotting cutter. When the roughing teeth are arranged behind the cutting face being finished and where the pitch circle of generation is substantially less than the pitch circle taken at the outside diameter of the blank, the cutting edges formed on the blank are sharp. In other cases where the pitch circle of generation is the same as the outside diameter of the blank, the edges become somewhat blunt. In the above case where the teeth of the hob extend to the side behind the cutting face of the blank which is being finished, it is not necessary to provide interrupted threads in order to obtain sharp edges.

Attention is called to the fact that the racks which correspond to the hobs shows in Figs. 3 and 4 of the drawings are provided with tooth sides which are perpendicular to the path of movement of the rack. However, it is possible to use tapered hobs having cutting edges inclined with respect to the said path such as are shown in Fig. 2 in the drawings if so desired. In both cases the cutting edges are inclined with respect to the hob axis.

In Figs. 6, 7, 8 and 9, conical hobs are shown cutting undercut teeth on milling cutter blanks. The chief or main application of taper or conical hobs may be said to be the cutting of undercut teeth on milling cutter blanks having either straight or spiral flutes. In Fig. 6 of the drawings, a hob 30 having teeth 31 formed thereon is adapted to rotate on an axis $X^2Y^2$. The hob is provided with a finishing tooth 32 which is located on the larger end of the hob. A blank 33 having teeth 34 thereon is adapted to rotate on an axis $C^2$. The blank 33 is shown rotating in a clockwise direction and the hob 30 is shown rotating in a clockwise direction when viewed from the right of Fig. 6 of the drawings. The cutting faces, which are formed on the teeth 34 of the blank 33, are assumed to be parallel to lines drawn tangent to a circle having a center at $C^2$ and having a radius $e$. The pitch $p^2$ of the rack or hob corresponds to a circular pitch having a radius $C^2$—35 or $C^x$—36. It will be noted in Fig. 6 the rack or hob teeth assume positions in front of the face being cut on the blank. The finishing cutting edge is on the outside of the last tooth of the hob. Moreover, it should be noted that a pitch equal to or larger than the pitch $p^z$ insures clearing of the teeth. The sides of the teeth of the rack or hob are formed perpendicularly to the path of travel of the rack.

The conical hob shown in Fig. 6 corresponds somewhat to the hob shown in Fig. 3 inasmuch as the finishing tooth is located on the larger end of the hob. As has already been set forth, the cutting action of the hob is more uniformly distributed over the teeth if the roughing teeth are located at the larger end and the finishing tooth is located at the smaller end thereof. However, this advantage is somewhat reduced when the blank is provided with helical flutes. Moreover, the advantage is reduced in accordance with the angle at which the hob is set with respect to the blank. In all cases the hob is fed parallel to the blank axis.

Figs. 7, 8 and 9 disclose hobs wherein the cutting teeth are arranged behind the cutting face of the tooth to be cut on the blank and where the finishing cutting edge is located on the inside of the hob's last tooth. The hob shown in Fig. 7 corresponds to a rack with sides which are perpendicular to the direction of travel of the rack. The pitch of such rack corresponds to the circular pitch at a radius $C^3$—37, the point 37 being the intersection point of a line $C^3Z$ perpendicular to the direction of travel of the rack and a line drawn through the inside point 38 perpendicular to the flute profile of the blank. Fig. 6 and Fig. 7 show the hobs in a position wherein the generating teeth are horizontal in order to show analogy to Fig. 1 and Fig. 2. The hobs may be placed in a horizontal position. No double angular setting will be required in cutting radial or undercut teeth on a blank. The hob 39 shown in Fig. 7 is provided with teeth 40 which are formed on a conical body portion 41. The finishing tooth 42 is shown in engagement with the teeth 43 of a blank 44. The hob rotates in a clockwise direction on an axis $X^3Y^3$ and the blank rotates in a counterclockwise direction on an axis $C^3$. The cutting faces formed on the teeth of the blank 44 are assumed to be formed along lines tangent to a circle having a radius $e'$ and a center at $C^3$. The pitch $p^3$ is assumed to be less than the pitch taken at the outside diameter of the blank.

In Fig. 8 of the drawings, a hob 46 is shown provided with teeth 47 which are formed on a conical body portion 48. The hob is provided with a finishing tooth 49 which is formed on the smaller end of a hob. The hob rotates in a clockwise direction on an axis $X^4Y^4$ and is shown in engagement with a blank 50. The blank 50 rotates in a counterclockwise direction on an axis $C^4$ and is provided with teeth 51.

The hob 46 shown in Fig. 8 is provided with a larger taper than the hob 39 shown in Fig. 7. The rack corresponding to the hob 46 moves towards the right as shown in Fig. 8 of the drawings along the line M′N′. The tooth sides, it should be noted, are inclined with respect to the direction of movement of the rack corresponding to the hob. The maximum pitch to be used on the rack may be found in the same manner as in the cases heretofore considered. It may may be noted that the steeper hob will prove more satisfactory in service but is somewhat more difficult to manufacture.

Fig. 9 illustrates a cutting position of a conical hob similar to the hob shown in Fig. 7. The hob is shown to be provided with right hand spirals and to cut left hand spiral flutes on the blank. The roughing teeth cut prior to the finishing tooth at each revolution. The roughing teeth are located on the larger end of the conical surface.

It is to be understood that the above described action of form hobs refers merely to the straight cutting edges which cut the flute faces of the blanks. The other part of the cutting profile may have a generating action, if so desired. It should be noted that hobs of the above indicated type may be made multiple threaded as well as single threaded and may be provided with straight or spiral flutes and with undercut or radial teeth. All of such hobs must be centered and their axial position cannot be assumed at will.

It should be understood that such changes and modifications may be made in my invention as fall within the limits of the appended claims.

What I claim is:

1. A form hob, comprising teeth arranged in the form of a thread and having only one finishing cutting edge, the teeth having substantially straight cutting edges inclined with respect to the hob axis and the finishing cutting edge being located at one end of the hob.

2. A form hob having only one finishing cutting edge, comprising teeth each having one substantially straight cutting edge inclined with respect to the hob axis, the finishing cutting edge being located at the end of the hob and adapted to be positioned outside a plane perpendicular to the hob axis and radial with respect to the blank being operated on.

3. A form hob for cutting flutes, comprising teeth each having one substantially straight cutting edge inclined with respect to the hob axis, the pitch of the hob teeth being different from the pitch of the blank teeth at the outside diameter of the blank.

4. A form hob for cutting helicoidal flutes in a milling cutter blank, comprising teeth each having one straight cutting side inclined with respect to the hob axis, a single finishing cutting edge on the hob located at the end thereof.

5. A form hob for cutting flutes in a milling cutter blank, comprising teeth each having one substantially straight cutting edge inclined with respect to the hob axis, one finishing cutting edge being located at the end of the hob and positioned on one side or the other side of an end hob tooth according to the pitch of the hob with respect to the pitch of the teeth being cut.

6. A form hob for cutting flutes in a milling cutter blank, comprising teeth each having one substantially straight cutting edge inclined with respect to the hob axis, one finishing cutting edge being located on the end tooth of the hob, the finishing cutting edge being located on the outside of the last hob tooth if the pitch of the hob is larger than the pitch of the blank and being located inside the last tooth if the hob pitch is smaller than the pitch of the blank when measured on the outside diameter.

7. A hob, comprising teeth having a pitch different from the pitch of the teeth to be cut on a blank, the cutting edges of the hob teeth which form the front cutting faces of the blank teeth being inclined and not perpendicular to the hob axis for cutting teeth having helicoidal front cutting faces on a blank.

8. A hob, comprising teeth having a pitch different from the pitch of the teeth to be cut on a blank, the cutting edges of the hob teeth which form the front cutting faces of the blank teeth being inclined and not perpendicular to the hob axis for cutting undercut teeth on a blank.

9. A hob comprising teeth arranged in the form of a thread and having a pitch different from the pitch of the teeth to be cut on a blank, the cutting edges of the hob teeth which form the front cutting faces of the blank teeth being inclined and not perpendicular to the hob axis, whereby undercut teeth having helicoidal front cutting faces may be formed on the blank.

10. A conical hob, comprising teeth arranged in the form of a thread on a conical body portion, one tooth at the end of the hob being adapted to effect straight finishing cuts on the teeth of a blank.

11. A conical hob, comprising teeth arranged in the form of a thread on a conical body portion, one tooth at the end of the hob having the smaller diameter being adapted to effect straight finishing cuts on the teeth of a blank.

12. A conical hob, comprising teeth arranged in the form of a thread on a conical body portion, one tooth at the end of the hob having the smaller diameter being adapted to effect a straight finishing cut on the teeth of a blank and the remaining teeth on the hob being adapted to effect roughing cuts on the teeth of the blank.

13. A conical hob, comprising teeth formed on a conical body portion, one of said teeth serving to effect a finishing cut on the blank teeth to form undercut teeth.

14. A conical hob, comprising teeth formed on a conical body portion, one tooth at one end of the hob being adapted to effect finishing cuts to form undercut blank teeth.

15. A conical hob, comprising teeth formed on a conical body portion, one of said teeth serving to effect a finishing cut on the blank teeth to form undercut teeth having helicoidal front cutting faces.

16. A conical hob, comprising teeth arranged in the form of a thread on a conical body portion, one tooth at the end of the hob having the smaller diameter being adapted to effect finishing cuts to form undercut blank teeth.

17. A conical hob, comprising teeth formed on a conical body portion, one tooth at one end of the hob having the smaller diameter serving to cut undercut teeth having helicoidal front cutting faces.

18. A conical hob, comprising teeth formed on a conical body portion, one of said teeth serving to effect a finishing cut on the blank teeth to form teeth having helicoidal front cutting faces.

19. A conical hob, comprising teeth arranged in the form of a thread on a conical body portion, the pitch of the hob being smaller than the pitch of the blank to be cut.

20. A conical hob, comprising teeth arranged in the form of a thread on a conical body portion, the pitch of the hob being smaller than the pitch of the blank and one tooth at one end of the hob serving to effect finishing cuts to form undercut blank teeth.

21. A conical hob having one finishing cutting edge and comprising teeth arranged in the form of a thread on a conical body portion, each of the teeth having one substantially straight cutting edge which is inclined with respect to the hob axis and the finishing cutting edge being located at the end of the hob.

22. A conical hob having one finishing cutting edge and comprising undercut teeth arranged in the form of a thread on a conical body portion, each of the teeth having one substantially straight cutting edge which is inclined with respect to the hob axis and the finishing cutting edge being located at the end of the hob.

23. A conical hob having one finishing cutting edge and comprising teeth arranged in the form of a thread on a conical body portion, said teeth having substantially straight cutting edges inclined with respect to the hob axis and the finishing cutting edge being located on the inside of an end hob tooth.

24. A conical hob having one finishing cutting edge and comprising undercut teeth arranged in the form of a thread on a conical body portion, the teeth having substantially straight cutting edges inclined with respect to the hob axis and the finishing cutting edge being located outside or inside an end tooth on the hob according to the hob pitch with respect to the pitch of the blank being cut.

In testimony whereof, I hereto affix my signature.

ERNEST WILDHABER.